US008237587B2

(12) United States Patent
Fukumura

(10) Patent No.: US 8,237,587 B2
(45) Date of Patent: Aug. 7, 2012

(54) CONTINUOUSLY-ARRANGED SENSOR SYSTEM, NETWORK UNIT, AND SENSOR UNIT

(75) Inventor: Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 483 days.

(21) Appl. No.: 12/639,445

(22) Filed: Dec. 16, 2009

(65) Prior Publication Data

US 2010/0176965 A1 Jul. 15, 2010

(30) Foreign Application Priority Data

Jan. 13, 2009 (JP) ................................ 2009-005230

(51) Int. Cl.
*G08C 19/16* (2006.01)

(52) U.S. Cl. ........... 340/870.01; 340/286.02; 340/573.1; 340/693.9; 340/686.1; 340/572.1; 455/524; 455/435.1; 455/129; 455/561; 709/221; 709/201; 709/209; 348/295; 713/153; 713/154; 370/338; 370/254

(58) Field of Classification Search ............. 340/870.01, 340/573.1, 693.9, 286.02, 686.1, 682, 539.1, 340/572.1, 521, 531, 679; 370/338, 254; 713/153, 154; 250/208.1; 455/524, 435.1, 455/561, 129; 709/221, 201, 209; 348/295; 384/91, 459; 702/122; 600/347, 365; 356/218
See application file for complete search history.

(56) References Cited

U.S. PATENT DOCUMENTS

| | | | | |
|---|---|---|---|---|
| 5,003,169 | A | 3/1991 | Sakaguchi et al. | |
| 5,818,123 | A | 10/1998 | Iwasaki et al. | |
| 6,211,784 | B1 | 4/2001 | Nishide | |
| 6,556,935 | B2 * | 4/2003 | Morimura et al. | 702/104 |
| 7,006,942 | B2 * | 2/2006 | Fukumura | 702/122 |
| 7,091,854 | B1 * | 8/2006 | Miao | 340/539.26 |
| 7,411,319 | B2 | 8/2008 | Suhara et al. | |
| 7,793,017 | B2 * | 9/2010 | Gehring et al. | 710/63 |
| 2010/0185418 | A1 * | 7/2010 | Fukumura et al. | 702/188 |
| 2010/0308210 | A1 * | 12/2010 | Saitou et al. | 250/208.2 |

FOREIGN PATENT DOCUMENTS

| | | |
|---|---|---|
| JP | 09-064712 | 3/1997 |
| JP | 09-083330 | 3/1997 |
| JP | 09-097658 | 4/1997 |
| JP | 09-161631 | 6/1997 |
| JP | 09-252242 | 9/1997 |
| JP | 2000-224202 | 8/2000 |
| JP | 2003-097983 | 4/2003 |
| JP | 2003-108204 | 4/2003 |
| JP | 2003-110415 | 4/2003 |
| JP | 2003-110416 | 4/2003 |
| JP | 2004-295276 | 10/2004 |

* cited by examiner

*Primary Examiner* — Lam T Mai

(74) *Attorney, Agent, or Firm* — Kilyk & Bowersox, P.L.L.C.

(57) ABSTRACT

A continuously-arranged sensor system is provided that can eliminate a shift in timing between a determination signal of each sensor unit and sensor information relating to the determination signal. The continuously-arranged sensor system includes a network unit and a plurality of sensor units, which are connected by a serial transmission line and a parallel transmission line. In accordance with a command sent from the network unit, each sensor unit transmits the determination signal and the sensor information, provided at the same time as the determination signal, to the network unit via the serial transmission line. Therefore, the network unit can obtain the determination signal and the sensor information exhibited at the same time.

10 Claims, 13 Drawing Sheets

FIG. 4A

| | | | |
|---|---|---|---|
| 14-1 | # 1 | ON/OFF | AMOUNT OF RECEIVED LIGHT |
| | # 2 | ON/OFF | AMOUNT OF RECEIVED LIGHT |
| | # 3 | ON/OFF | AMOUNT OF RECEIVED LIGHT |
| | # 4 | ON/OFF | AMOUNT OF RECEIVED LIGHT |
| | ⋮ | ⋮ | ⋮ |
| | # 16 | ON/OFF | AMOUNT OF RECEIVED LIGHT |
| 14-2 | # 1 | ON/OFF | |
| | # 2 | ON/OFF | |
| | ⋮ | ⋮ | |
| | # 16 | ON/OFF | |

FIG. 4B

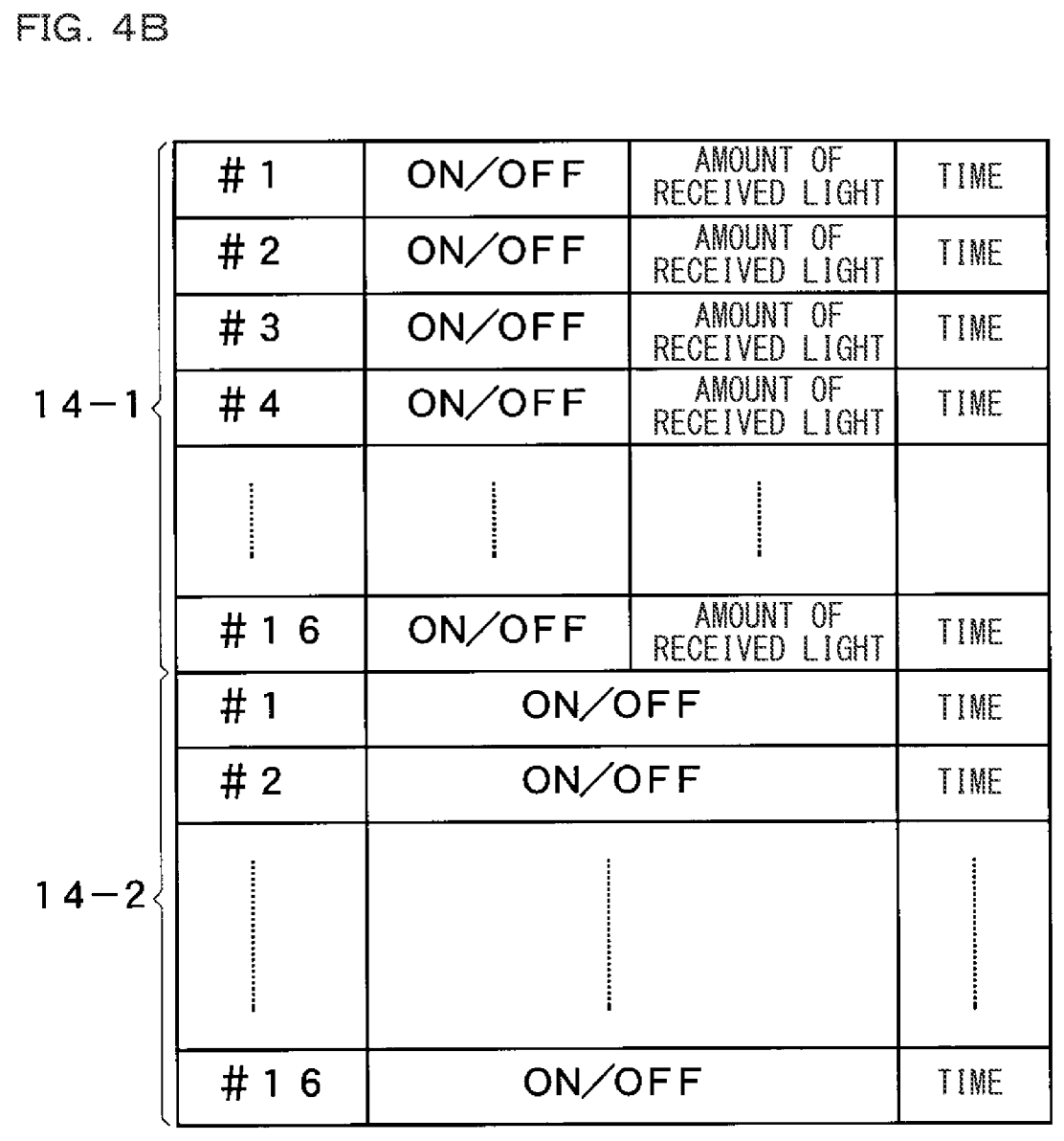

| | | | | |
|---|---|---|---|---|
| 14-1 | # 1 | ON/OFF | AMOUNT OF RECEIVED LIGHT | TIME |
| | # 2 | ON/OFF | AMOUNT OF RECEIVED LIGHT | TIME |
| | # 3 | ON/OFF | AMOUNT OF RECEIVED LIGHT | TIME |
| | # 4 | ON/OFF | AMOUNT OF RECEIVED LIGHT | TIME |
| | ⋮ | ⋮ | ⋮ | |
| | # 1 6 | ON/OFF | AMOUNT OF RECEIVED LIGHT | TIME |
| 14-2 | # 1 | ON/OFF | | TIME |
| | # 2 | ON/OFF | | TIME |
| | ⋮ | ⋮ | | ⋮ |
| | # 1 6 | ON/OFF | | TIME |

FIG. 8

| | | | |
|---|---|---|---|
| 14-1 | #1 | ON | 1500 |
| | #2 | ON | 2000 |
| | #3 | OFF | 1800 |
| | #4 | OFF | 700 |
| | ⋮ | ⋮ | ⋮ |
| | #16 | OFF | 3000 |
| 14-2 | #1 | ON | |
| | #2 | OFF | |
| | ⋮ | ⋮ | |
| | #16 | ON | |

FIG. 9

| | | | |
|---|---|---|---|
| 14-1 | #1 | ON | 1500 |
| | #2 | ON | 2000 |
| | #3 | OFF | 1800 |
| | #4 | OFF | 700 |
| | ⋮ | ⋮ | ⋮ |
| | #16 | OFF | 3000 |
| 14-2 | #1 | ON | |
| | #2 | OFF | |
| | ⋮ | ⋮ | |
| | #16 | ON | |

FIG. 10

| | | | |
|---|---|---|---|
| 14-1 | #1 | ON | 1500 |
| | #2 | ON | 2000 |
| | #3 | OFF | 1800 |
| | #4 | OFF | 700 |
| | ⋮ | ⋮ | ⋮ |
| | #16 | OFF | 3000 |
| 14-2 | #1 | ON | |
| | #2 | OFF | |
| | ⋮ | ⋮ | |
| | #16 | ON | |

CONTINUOUSLY-ARRANGED SENSOR SYSTEM, NETWORK UNIT, AND SENSOR UNIT

CROSS-REFERENCE TO RELATED APPLICATIONS

The present application claims foreign priority based on Japanese Patent Application No. 2009-5230, filed Jan. 13, 2009, the contents of which is incorporated herein by reference.

BACKGROUND OF THE INVENTION

1. Field of the Invention

The present invention relates to a continuously-arranged sensor system for monitoring a state of an object to be detected, and also relates to a network unit and a sensor unit used for the continuously-arranged sensor system.

2. Description of the Background Art

In a manufacturing process in an automated manufacturing line, a process state of a workpiece is monitored in order to reliably process the workpiece. Therefore, in the automated manufacturing line, many sensors are arranged in proximity to the workpiece (object to be detected) so as to monitor the process state, and the workpiece is processed while a determination signal of each sensor is monitored.

In this kind of sensor system, it is cumbersome to prepare wirings between many sensors and a control apparatus of the sensors. Therefore, a continuously-arranged sensor system is known and utilized, in which these apparatuses are made into units and each unit is connected by physically coupling each unit, so that wirings between the units are completed at a time. In the continuously-arranged sensor system, many sensor units are continuously arranged in proximity to a workpiece, and many sensor heads such as optical fibers connected to each sensor unit are arranged in proximity to a portion of a workpiece to be monitored. In the continuously-arranged sensor system, a detection signal output from each sensor unit is monitored by a host control apparatus via a network unit.

Japanese Patent Application Laid-Open No. 2004-295276 describes a continuously-arranged sensor system for transmitting a sensor determination signal from each sensor unit to a network unit in real time, wherein two transmission paths, i.e., a parallel transmission and a serial transmission, are prepared as a method for transmitting other sensor information.

According to this configuration, since the sensor determination signal (ON/OFF signal) provided by each sensor unit is respectively independently transmitted via the parallel transmission path to the network unit side, the sensor determination signal can be transmitted to the network unit side without delay. Therefore, the workpiece can be operated at a fast speed. Further, a centralized control such as follows can be achieved: various kinds of sensor information such as the amount of received light and thresholds of sensors are transmitted to the network unit side via the serial transmission line, and a host control apparatus centrally manages the information. Alternatively, an instruction signal is transmitted from the host control apparatus or the network unit to each sensor unit so as to change controls and settings of light emitting timing of a sensor head in each sensor unit.

SUMMARY OF THE INVENTION

However, in the configuration described in Japanese Patent Application Laid-Open No. 2004-295276, although the sensor determination signal can be transmitted to the network unit side without delay, a delay in time occurs in the transmission of various kinds of sensor information via a serial signal. Therefore, there is a problem in that the sensor information and the determination signal cannot be synchronized with each other, and a contradiction occurs between the sensor information and the determination signal. For example, in a case where the sensor unit is a transparent-type photoelectric sensor unit, there is a possibility that the determination signal incorrectly indicates a presence of a workpiece when in fact there is no workpiece in an object detection area and the light receiving side receives a sufficient amount of light.

The present invention is made to solve such problems, and it is the object of the present invention to provide a continuously-arranged sensor system for processing a workpiece at a fast speed by transferring a determination signal of each sensor to a network unit side at a fast speed and capable of transferring sensor information synchronized with the determination signal of each sensor to the network unit side, and also to provide a network unit and a sensor unit used for this sensor system.

In order to solve this problem, the continuously-arranged sensor system of the present invention is a continuously-arranged sensor system including: a network unit connected to a host control apparatus; and at least one or more sensor units, wherein the network unit and any one of the sensor units are physically connected with each other, and the sensor units are physically connected with each other, wherein the sensor unit includes: a sensor unit for outputting a detection signal in accordance with a physical quantity detected from an object; a control unit for generating a determination signal upon comparing the detection signal with a predetermined threshold value, and receiving a command from the network unit, the control unit transmitting the determination signal and sensor information relating to the detection signal as a serial signal; a connection unit for connecting to the adjacent network unit or the adjacent sensor unit; a serial transmission unit for transmitting and receiving the serial signal; and a parallel transmission line for transmitting, in parallel, each of the determination signals generated by the control units of the sensor units, wherein the network unit includes: a connection unit for connecting to any one of the sensor units that is adjacent to the network unit; a serial transmission unit for transmitting and receiving a command, the determination signal, and the sensor information as a serial signal, wherein the command is transmitted to the sensor unit, and wherein the determination signal and the sensor information are transmitted from the sensor unit; a control unit for requesting to the coupled sensor unit for a current determination signal and current sensor information, and receiving the determination signal and the sensor information transmitted via the serial transmission unit; and a memory including a first area for storing a pair of the determination signal and the sensor information transmitted from the sensor unit via the serial transmission unit and a second area for storing the determination signal transmitted from each of the sensor units via the parallel transmission line.

In order to solve this problem, the continuously-arranged sensor system of the present invention is a continuously-arranged sensor system including: a network unit connected to a host control apparatus; and at least one or more sensor units, wherein the network unit and any one of the sensor units are physically connected with each other, and the sensor units are physically connected with each other, wherein the sensor unit includes: a sensor unit for outputting a detection signal in accordance with a physical quantity detected from an object; a control unit for generating a determination signal upon comparing the detection signal with a predetermined threshold value, and receiving a command from the network unit, the control unit transmitting the determination signal and sensor information relating to the detection signal as a serial signal; a connection unit for connecting to the adjacent network unit or the adjacent sensor unit; a serial transmission unit for transmitting and receiving the serial signal; and a parallel transmission line for transmitting, in parallel, each of the determination signals generated by the control units of the sensor units, wherein the network unit includes: a connection unit for connecting to any one of the sensor units that is adjacent to the network unit; a serial transmission unit for transmitting and receiving a command, the determination signal, and the sensor information as a serial signal, wherein the command is transmitted to the sensor unit, and wherein the determination signal and the sensor information are transmitted from the sensor unit; a control unit for requesting to the coupled sensor unit for a current determination signal and current sensor information, and receiving the determination signal and the sensor information transmitted via the serial transmission unit; and a memory for storing a pair of the determination signal and the sensor information transmitted from the sensor unit via the serial transmission unit, wherein the determination signal transmitted from each of the sensor units via the parallel transmission line is transmitted to the host control apparatus as it is.

The control unit of the network unit may transmit a data transmission command to a predetermined sensor unit via the serial transmission unit so as to request the determination signal and the sensor information.

The continuously-arranged sensor system may further have a synchronization signal line connected between the network unit and each of the sensor units, wherein the control unit of the network unit may transmit a request for the determination signal and the sensor information via the synchronization signal line to a predetermined sensor unit.

The control unit may transmit a request signal to all of the coupled sensor units.

The control unit may transmit a request signal to a predetermined sensor unit.

The sensor information may be any one of the detection signal to be detected, a peak hold value thereof, a bottom hold value thereof, a threshold value for determination, and a margin.

The connection unit of the network unit may include a connector for making a connection in terms of signal, the connection unit of the sensor unit may include a connector for making a connection in terms of signal, and the serial transmission line and the parallel transmission line may be formed between the units by connecting the units via the connection unit of the network unit and the sensor unit.

A determination signal referred to in the present invention means a binary signal obtained by comparing a signal generated based on a sensor detection signal with a predetermined threshold value.

In a continuously-arranged sensor system according to the present invention, the determination signal and information about sensor detection performed by each sensor unit are transmitted to a network unit side via a serial transmission unit. When the determination signal of sensor is added to the serial-transmitted information about sensor detection (sensor information), the determination signal and the information about detection of the sensor information can be synchronized with each other. Therefore, the network unit or a host control apparatus displays data upon sampling the received serial signal with an appropriate interval, thus being able to centrally manage operational state of each sensor unit. The network unit can manage the operational state of each sensor unit on the basis of the received information. Further, the host control apparatus can centrally manage the operational state of each sensor unit when necessary data are transmitted to the host control apparatus.

A transparent-type and a reflective-type photoelectric sensor unit can be used as the sensor unit according to the present invention. When a photoelectric sensor is employed, a fiber sensor in which an optical fiber extends from a sensor unit to an object detection area is preferable. When a fiber sensor is used, it is necessary to connect a sensor head to a sensor unit. Accordingly, the fiber sensor requires a large footprint of a light-receiving element and a light-emitting element in the unit and the connection structure of the sensor head. Therefore, one sensor unit is preferably configured to have one sensor head.

When a photoelectric sensor is used as the sensor unit, a detection signal represents the amount of received light. Other forms of sensor units may be used as a sensor, such as a proximity sensor, a pressure sensor, and an ultrasonic wave sensor. The detection signals of the above sensors represent a distance to a workpiece, a pressure, a volume level, respectively.

In the present invention, a connection unit connecting between adjacent units includes a connection unit physically connecting between the units and a signal connection unit for transmitting a signal. Alternatively, a connection unit for transmitting a signal via an electrical connection and a connection unit for transmitting a signal by transmitting and receiving light may be employed as the signal connection unit for transmitting a signal.

In the continuously-arranged sensor system, a parallel transmission line may be formed with a pair of connectors arranged with the same number of connection terminals in each sensor unit. In this case, the connection terminals on a connector of the upstream side respectively correspond to the connection terminals on a connector of the downstream side. The sensor determination signals is provided to one of the connection terminals arranged on the upstream side. The connection terminals of the downstream side, except for the connection terminal to which the determination signal is connected, are connected to the connection terminals on the upstream side in such a manner that the correspondence is sequentially shifted on the basis of a predetermined rule. The parallel transmission line can be structured as described above.

According to the invention of claims 1 to 8 of the present application, simultaneousness between the determination signal and the sensor information obtained via the serial transmission unit is ensured. This signal is once stored to the memory, and can be transmitted to the host control apparatus in response to a request sent from the host control apparatus. Therefore, the continuously-arranged sensor system is provided that can obtain the noncontradictory signal.

The sensor determination signal output by each sensor unit is respectively independently transmitted to the network unit via the parallel transmission line without delay. The network unit can determine a processing situation of an object to be detected by referencing the received determination signal of each sensor.

According to the invention of claim 2, the sensor determination signal output from each sensor unit is input to the host control apparatus via the network unit. Therefore, the determination signal can be sent to the host control apparatus in real time.

The network unit according to claims 5 and 13 can obtain the determination signal and the sensor information exhibited at the same time from all of the connected sensor units. Further, the network unit according to claims 6 and 14 can obtain the determination signal and the sensor information exhibited at the same time from a predetermined sensor unit.

According to the invention described in claims 9 to 14, the network unit preferably applicable to this continuously-arranged sensor system can be provided.

According to the invention described in claims 15 and 16, the sensor unit preferably applicable to this continuously-arranged sensor system can be provided.

BRIEF DESCRIPTION OF THE DRAWINGS

FIG. 4A is an example of a table memory according to the first and second embodiments of the present invention;

FIG. 4B is another example of the table memory according to the first and second embodiments of the present invention;

FIG. 8 is a figure showing a table memory according to the first embodiment of the present invention in use;

FIG. 9 is a figure showing the table memory according to the first embodiment of the present invention in use;

FIG. 10 is a figure showing the table memory according to the first embodiment of the present invention in use;

DETAILED DESCRIPTION OF THE PREFERRED EMBODIMENTS

First Embodiment

Figure 1:
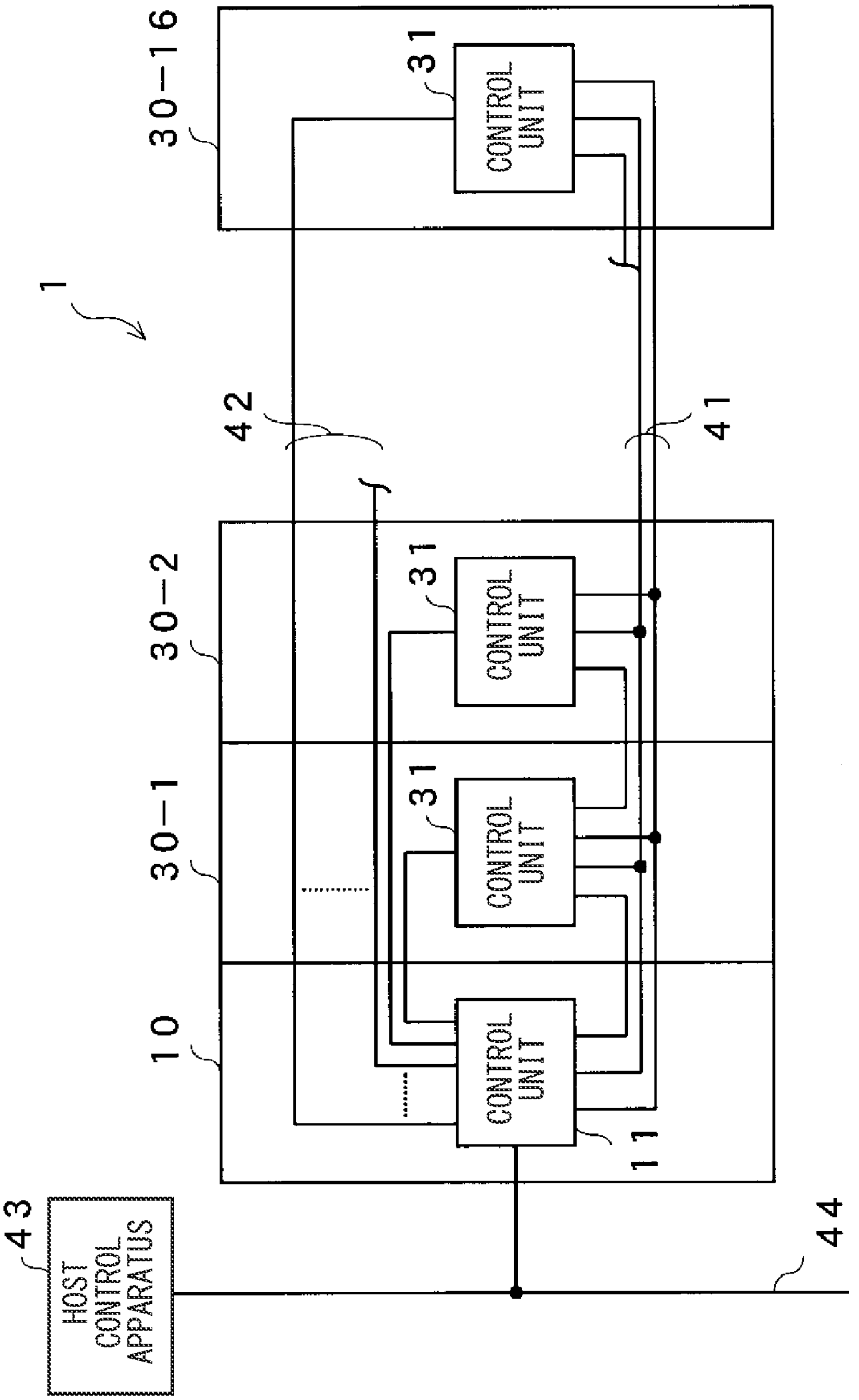
FIG. 1 is a figure showing an entire configuration of a continuously-arranged sensor system according to the first embodiment of the present invention.

FIG. 1 is a figure showing an entire configuration of a continuously-arranged sensor system according to the first embodiment of the present invention. The continuously-arranged sensor system 1 includes at least one sensor unit connected to a network unit 10. In this embodiment, a series of sixteen sensor units 30-1 to 30-16 are connected to the network unit 10. These units are electrically connected via a serial transmission line 41 or a parallel transmission line 42. The serial transmission line 41 is configured to include at least two serial transmission lines. The parallel transmission line 42 is connected to each sensor unit via one signal line, and includes at least sixteen lines. Hereinafter, a direction toward the network unit 10 is referred to as upstream direction, and a direction toward the sensor unit 30-16 is referred to as downstream direction. The network unit 10 is adapted to collect signals transmitted from the sensor units 30-1 to 30-16 and to transmit a necessary signal to a host control apparatus 43, and is connected to the host control apparatus 43 via a feed bus 44.

Figure 2:
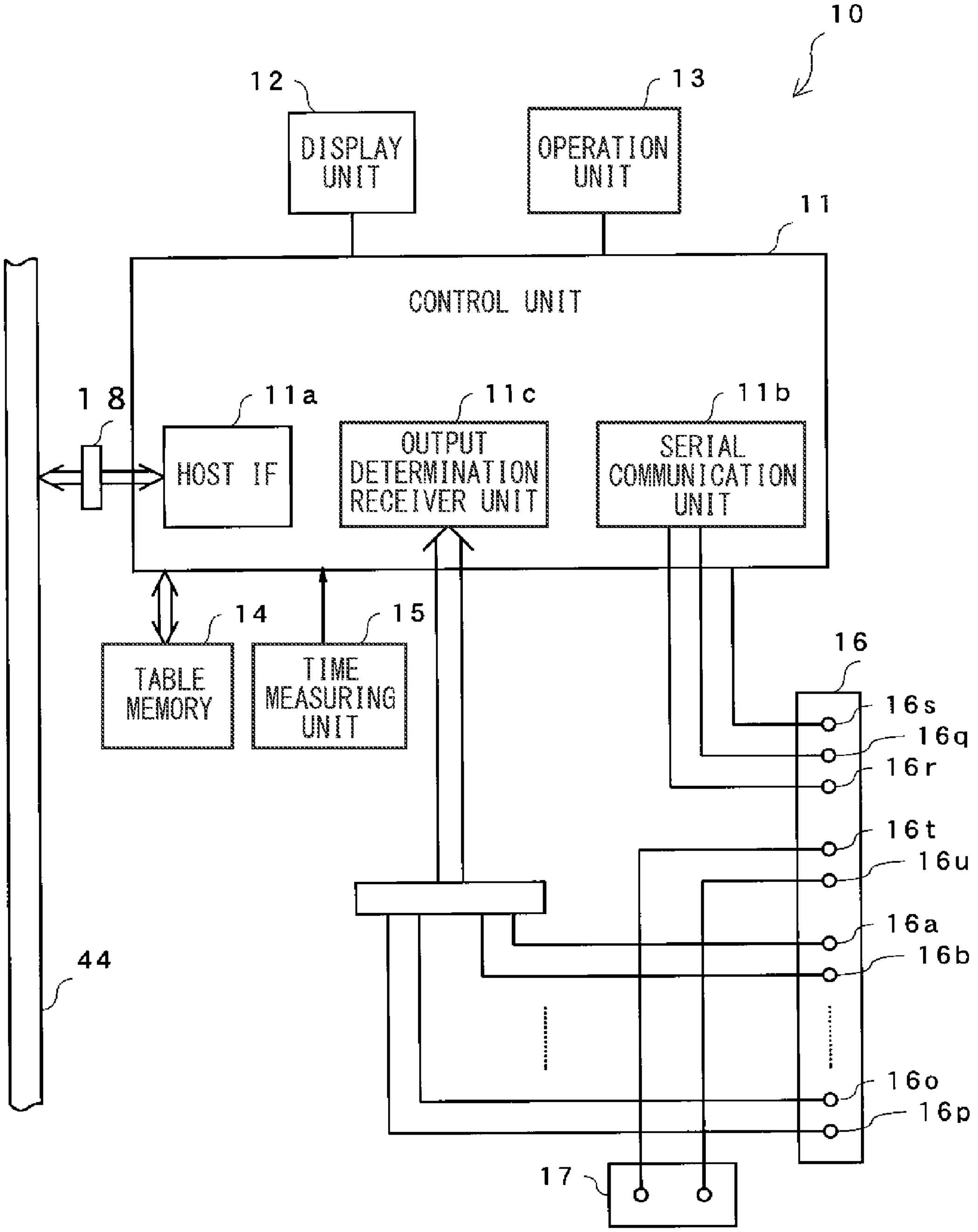
FIG. 2 is a block diagram showing a network unit according to the first embodiment.
Figure 3A:
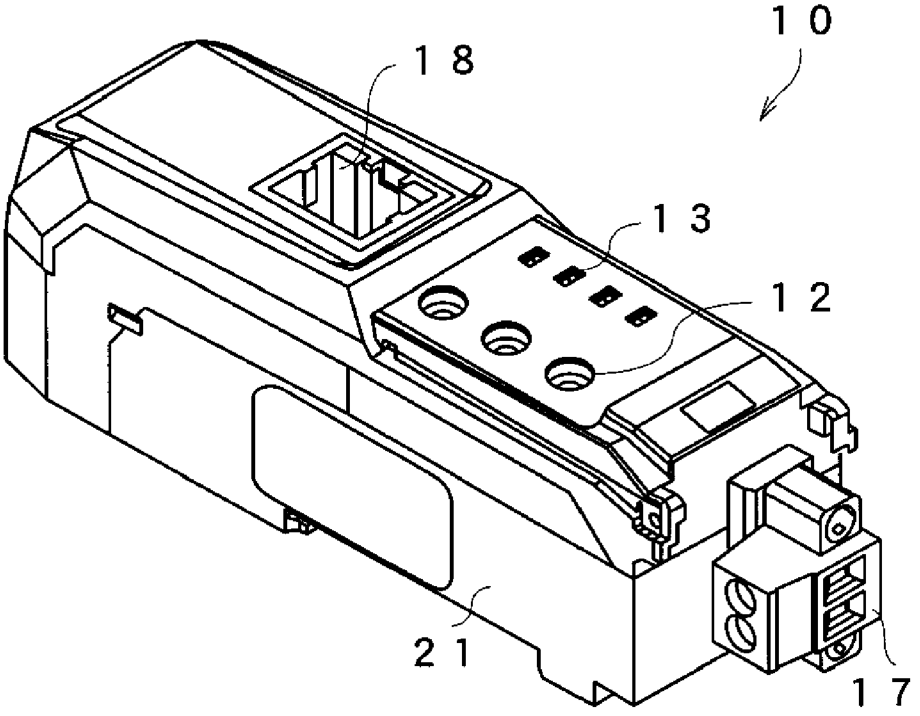
FIG. 3A is a perspective view showing the network unit according to the first embodiment seen from one side.
Figure 3B:
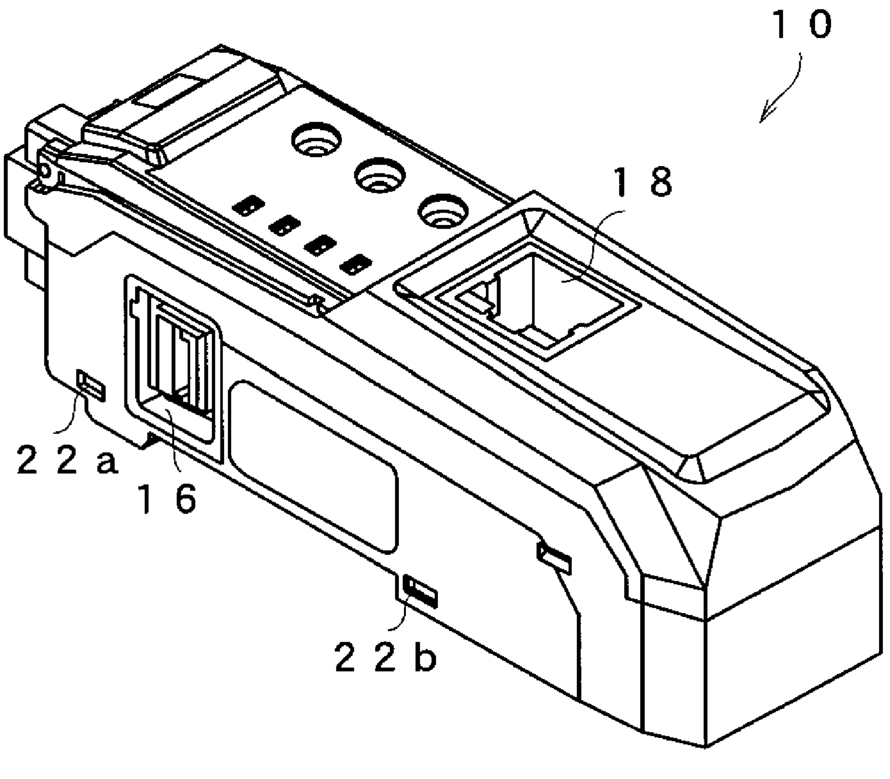
FIG. 3B is a perspective view showing the network unit of FIG. 3A seen from the other side.

Subsequently, each unit will be described in detail. FIG. 2 is a block diagram showing an internal configuration of the network unit 10. FIG. 3A and FIG. 3B are perspective views showing the network unit 10. FIG. 3A and FIG. 3B depict the network unit 10 from different angles.

As shown in FIG. 2, the network unit 10 includes a control unit 11. The control unit 11 includes a host interface (IF) 11*a*, a serial communication unit 11*b*, and an output determination receiver unit 11*c*. The control unit 11 of the network unit 10 is connected to a display unit 12, an operation unit 13, a table memory 14, a time measuring unit 15, and connectors 16, 17 and 18.

The control unit 11 according to the present embodiment is adapted to receive and store signals transmitted via a parallel transmission line 42, and output the signals to the host control apparatus 43 upon request. The control unit 11 is adapted to transmit and receive a serial signal to and from the sensor units via the serial transmission line 41.

The host interface 11*a* receives a command from the host control apparatus 43 via the connector 18, and transfers stored data to the host control apparatus 43.

The serial communication unit 11*b* is connected to the serial transmission line 41 of the connector 16, and performs serial communication with each sensor unit connected to the continuously-arranged sensor system. The serial communication unit 11*b* constitutes a serial transmission unit.

The output determination receiver unit 11*c* receives the determination signal of each sensor unit obtained from the parallel transmission line 42, and stores the determination signal to the table memory 14.

The table memory 14 is a memory medium (memory) for storing sensor information and the determination signals (ON/OFF signals) of many sensor units connected to this network unit 10. Specifically, the table memory 14 is a volatile or nonvolatile rewritable memory such as a RAM and an EEPROM. The table memory 14 is configured such that the sensor information and the determination signals (ON/OFF signals) of the sensor unit are stored to predetermined storage positions. As shown in FIG. 4A, the table memory 14 has a first area 14-1 and a second area 14-2. Herein, the sensor units 30-1 to 30-16 are represented as #1 to #16. The first area 14-1 stores the determination signals transmitted via the serial transmission line 41 and the sensor information in synchronization with the determination signals. The second area 14-2 stores current determination signals of the sensor units transmitted via the parallel transmission line 42. The determination signals transferred via this serial transmission line and the sensor information are signals of the same timing, which are different from the timing of the determination signals stored in the second area. In a case where, for example, the sensor unit is a photoelectric sensor, the sensor information represents the amount of received light thereof.

The time measuring unit 15 provides, to the control unit 11, time information such as a time at which data to be stored to the table memory 14 is collected. FIG. 4B shows an example of the table memory 14 attached with the time information output by the time measuring unit 15.

The connector 16 has many connection terminals, of which connection terminals 16*a* to 16*p* are terminals connected to the parallel transmission line 42. The connection terminals 16*q* and 16*r* are terminals connected to the serial transmission line 41. A terminal 16*s* is a connection terminal for a timing signal line. Connection terminals 16*t* and 16*u* are terminals for power supply, and are connected to the connector 17 for power supply.

The connector 16 of the network unit 10 constitutes a connection unit for electrically connecting to the sensor unit 30-1. The connector 16 transmits and receives the serial signal and the parallel signal via the serial transmission line 41 and the parallel transmission line 42, and is adapted to not only transmit a timing signal but also provide electric power to each sensor unit.

The network unit 10 is a unit containing members in a case 21 in a rectangular parallelepiped shape as shown in FIG. 3A and FIG. 3B. The network unit 10 is used by connecting one sensor unit to one sidewall thereof.

As shown in FIG. 3A, the connector 18 is arranged on a top surface of the case 21. The connector 18 is adapted to connect to the host control apparatus 43 such as a programmable controller and a computer. One longitudinal end of the case 21 is arranged with the connector 17 constituted by a screw-type terminal, to which a power supply line, not shown, is connected. An upper surface of the case 21 is arranged with the display unit 12 and operation switches of the operation unit 13.

As shown in FIG. 3B, one sidewall of the case 21 is arranged with the above-described connector 16. The connector 16 has twenty-one connection terminals, of which sixteen connection terminals connect to the parallel transmission line 42 on downstream side. Two connection terminals of the twenty-one connection terminals connect to the serial transmission line 41 on downstream side. The remaining connection terminals are used for timing and power supply.

One sidewall of the case 21 is arranged with engaging concave sections 22*a* and 22*b* in proximity to both longitudinal ends. Engaging protrusions arranged on the later-described sensor unit 30-1 are inserted into these engaging concave sections 22*a* and 22*b* so that the engaging concave sections 22*a* and 22*b* engage therewith. The engaging concave sections 22*a* and 22*b* constitute a connection unit for positioning and physical connection when the units are coupled with each other.

Figure 5:
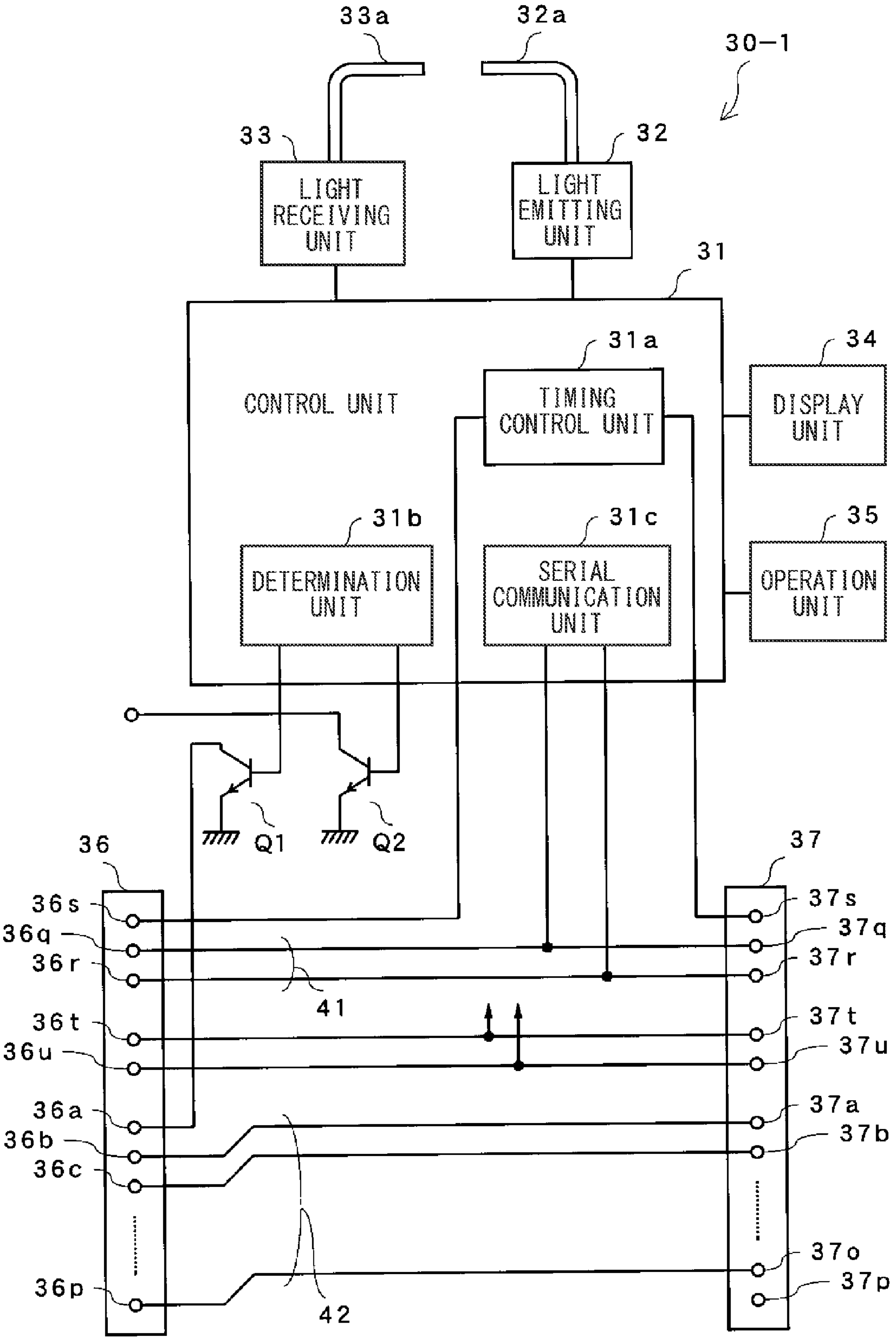
FIG. 5 is a block diagram showing a sensor unit according to the first embodiment.
Figure 6A:
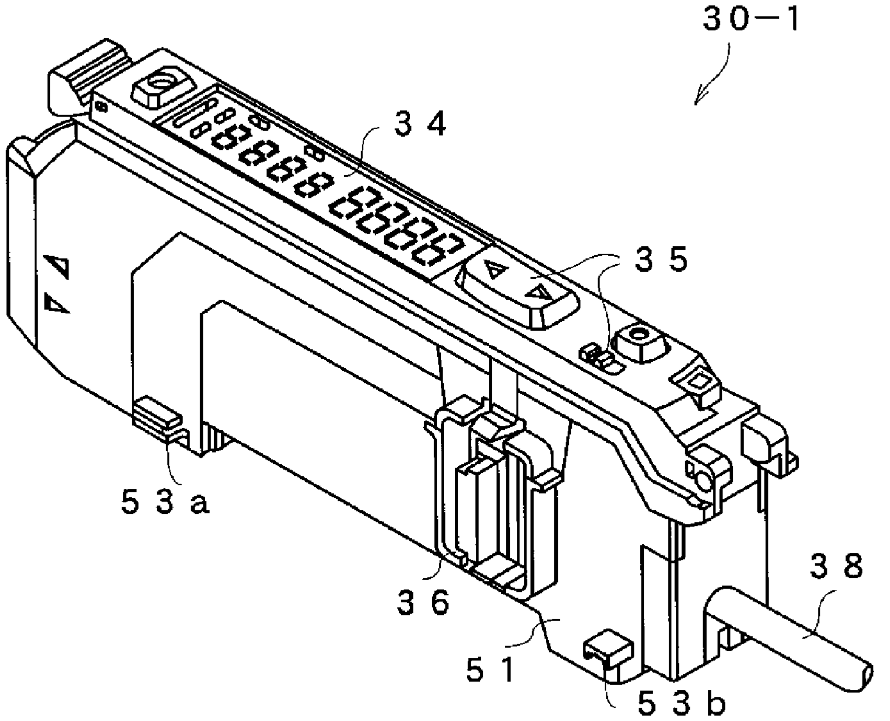
FIG. 6A is a perspective view showing the sensor unit according to the first embodiment of the present invention, seen from one side.
Figure 6B:
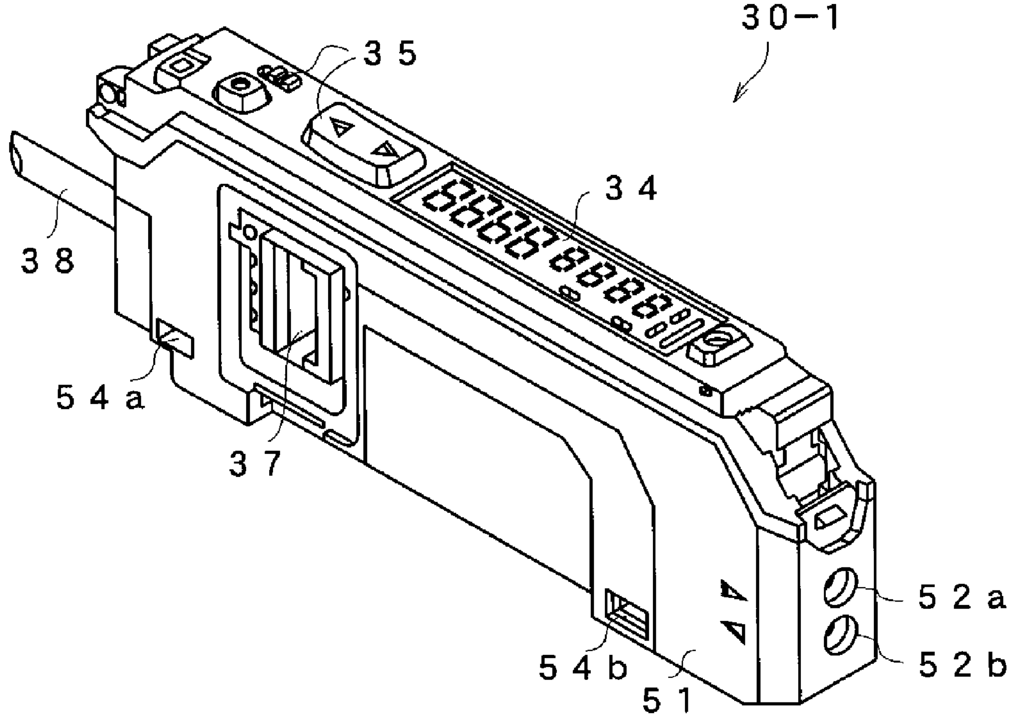
FIG. 6B is a perspective view showing the sensor unit of FIG. 6A, seen from the other side.

Subsequently, the sensor units are explained. In the present embodiment, the sixteen sensor units 30-1 to 30-16 are coupled, but each sensor unit has the same configuration. Therefore, only the sensor unit 30-1 will be explained with reference to drawings. FIG. 5 is a block diagram illustrating an internal configuration of the sensor unit 30-1. FIG. 6A is a perspective view showing the sensor unit 30-1 seen from one side. FIG. 6B is a perspective view showing the sensor unit 30-1 seen from the other side. In the sensor unit 30-1 according to the present embodiment, the photoelectric sensor has a head sensor made of a pair of optical fibers for emitting light and receiving light. A detection signal is generated in accordance with the amount of light received from the optical fiber for receiving light, and a determination signal is generated by making this detection signal into a binary value using a predetermined threshold value. This determination signal is output.

As shown in FIG. 5, the sensor unit 30-1 has a control unit 31 made with one chip gate array G and a microprocessor. A timing control unit 31*a*, a determination unit 31*b*, and a serial communication unit 31*c* are arranged in the control unit 31. The control unit 31 is connected to a light emitting unit 32, a light receiving unit 33, a display unit 34, an operation unit 35, output transistors Q1 and Q2, and connectors 36 and 37.

The timing control unit 31*a* gives a timing signal to the light emitting unit 32 when the timing signal is transmitted to a terminal 36*s*. Further, after a predetermined time, for example about 10 micro seconds, passes, the timing control unit 31*a* outputs a timing signal to a terminal 37*s*.

The determination unit 31*b* uses a predetermined threshold value according to the amount of received light to convert the detection signal into the determination signal by generating a binary value of either ON or OFF. The determination signal of the sensor is output to the parallel transmission line 42 via an output transistor Q1, or directly output to the outside via an output transistor Q2 and an output line 38.

The serial communication unit 31*c* is connected to the serial transmission line 41 of the connectors 36 and 37, and performs serial communication with the network unit 10 connected to the continuously-arranged sensor system. Therefore, the serial communication unit 31*c* constitutes a serial transmission unit.

The light emitting unit 32 drives a light emitting device on the basis of the timing signal transmitted from the timing control unit 31*a*. The light emitted by the light emitting device is transmitted via an optical fiber 32*a*, and the light is emitted from the tip of the optical fiber 32*a*. The light emitted by the optical fiber 32*a* enters into an optical fiber 33*a* via an object detection area, and is directed to the light receiving unit 33. The light receiving unit 33 converts the incident light into an electric signal, and amplifies the electric signal.

Herein, the light emitting unit 32, the light receiving unit 33, and the optical fibers 32*a* and 33*a* constitute a sensor unit for outputting the detection signal in accordance with physical quantities detected from the object.

The connector 36 is formed with a connector having the same shape as the connector 16 of the network unit 10 and the connector 37 of the adjacent sensor unit, and these connectors can be connected with each other. The connector 36 has sixteen connection terminals 36*a* to 36*p* connected to the upstream side of the parallel transmission line 42. The connection terminal 36*a* located at an end of the connection terminals 36*a* to 36*p* is connected to a collector of the output transistor Q1. Further, the connector 36 has two connection terminals 36*q* and 36*r* connected to the upstream side of the serial transmission line 41, a connection terminal 36*s* for the timing signal, and connection terminals 36*t* and 36*u* for power supply.

The connector 37 has sixteen connection terminals 37*a* to 37*p* connected to the downstream side of the parallel transmission line 42. The connection terminal 37*a* of the connector 37 is connected to the connection terminal 36*b* of the connector 36, and the connection terminal 37*b* of the connector 37 is connected to the connection terminal 36*c* of the connector 36. Similarly, the connection terminal 36*o* of the connector 37 is connected to the connection terminal 36*p* of the connector 36. As described above, each connection terminal of the downstream side parallel connection unit is connected to a next connection terminal of the upstream side parallel connection unit, thus constituting the parallel transmission line 42.

The connector 37 has two connection terminals 37*q* and 37*r* connected to the downstream side of the serial transmission line. The connection terminals 36*q* and 36*r* of the connector 36 are directly connected to the connection terminals 37*q* and 37*r* of the connector 37, respectively, thus constituting the serial transmission line 41.

The connection terminal 36*s* of the connector 36 is connected to the connection terminal 37*s* of the connector 37 via the timing control unit 31*a*. The connection terminals 36*t* and 36*u* of the connector 36 are directly connected to the connection terminals 37*t* and 37*u* of the connector 37, respectively, so as to provide electric power to the sensor unit 30-1 and the sensor units of downstream.

As shown in FIG. 6A and FIG. 6B, the sensor unit 30-1 is a unit containing members in a narrow case 51. An upper surface of the case 51 is arranged with a display unit 34 made with a four-digit seven-segment LED display device and an operation unit 35 made with various switches. The display unit 34 can digitally display the amount of received light and setting thresholds of the sensor and values such as the amount of received light, and margins.

The upper section of the case 51 is arranged with a cover for detachably covering the entire upper surface, but this cover is omitted from FIG. 6. The longitudinal end of the case 51 is arranged with head attachment holes 52*a* and 52*b* for attaching the optical fibers 32*a* and 33*a* and a fixing lever for fixing the optical fibers 32*a* and 33*a*.

As shown in FIG. 6A, one sidewall of the case 51 is arranged with the connector 36. The one sidewall of the case 51 is arranged with engaging protrusions 53*a* and 53*b* in proximity to both longitudinal ends. These engaging protrusions 53*a* and 53*b* are inserted into the engaging concave sections 22*a* and 22*b* of the network 10 to engage therewith. The engaging protrusions 53*a* and 53*b* constitute a connection unit for positioning and physical connection when the network unit is coupled. The connector 36 constitutes a connection unit for electrically connecting to a network unit 10 of upstream side or a sensor unit.

As shown in FIG. 6B, the other sidewall of the case 51 is arranged with the connector 37 at a position corresponding to the connector 36. The other sidewall of the case 51 is arranged with engaging concave sections 54*a* and 54*b* in proximity to both longitudinal ends. The engaging protrusions arranged on a sensor unit of downstream side are inserted into the engaging concave sections 54*a* and 54*b* to engage therewith. The engaging concave sections 54*a* and 54*b* constitute a connection unit for positioning and physical connection when the sensor units are coupled with each other. The connector 37 constitutes a connection unit for electrically connecting to a sensor unit of upstream side.

The sensor unit 30-1 according to the present embodiment can not only perform detection operation but also configure and switch an operational state with switch operations performed on the operation unit 35. For example, an operational mode of the sensor unit 30-1 and display data for the display unit 34 can be configured and switched. It is possible to switch which of input or non-input of light to the light receiving unit 33 causes an ON signal to output. It is possible to change the display data on the display unit 34 and switch the operational mode, on the basis of a command transmitted via the serial transmission line 41.

Figure 7:
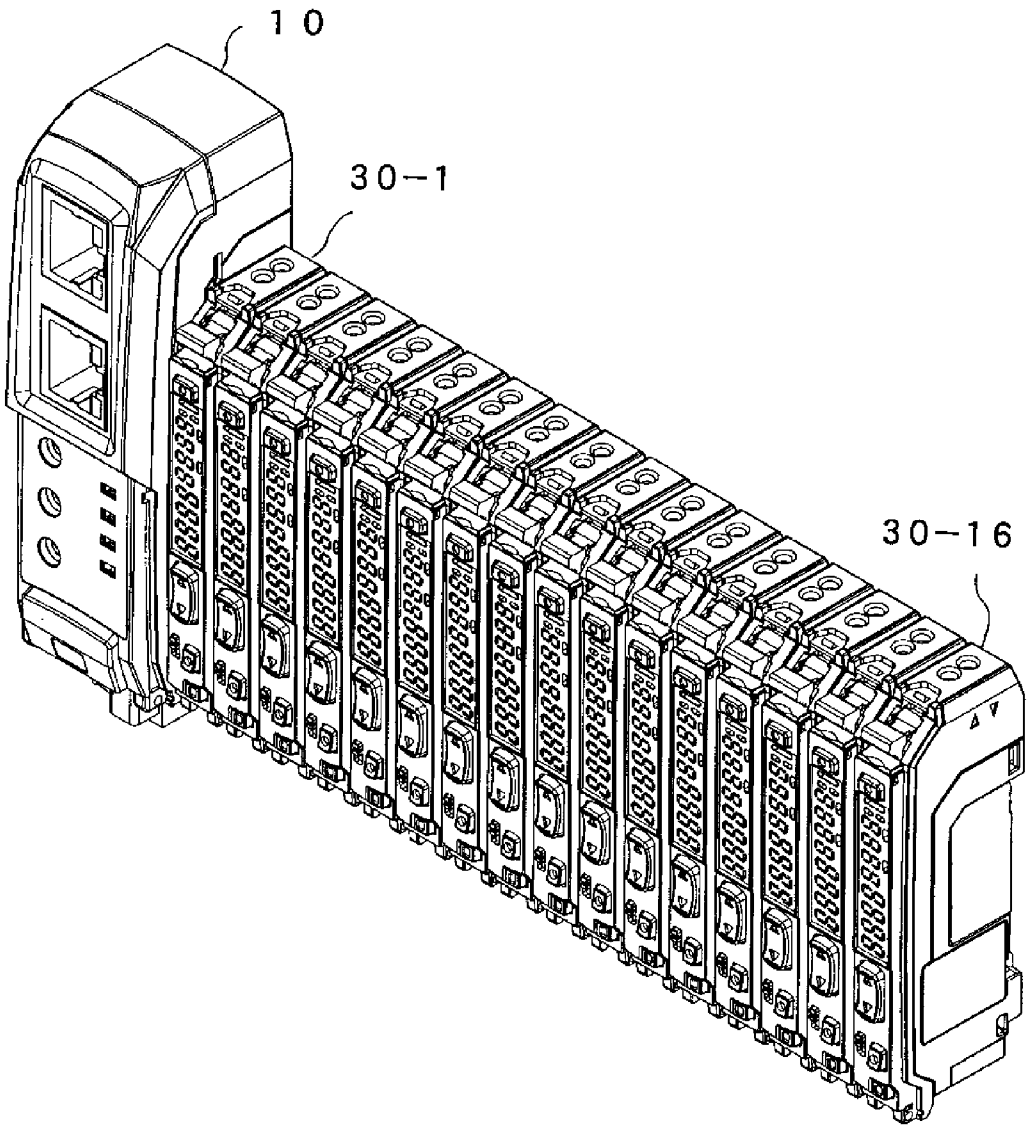
FIG. 7 is a perspective view showing the entire configuration of the continuously-arranged sensor system according to the first and second embodiments of the present invention.

Subsequently, a configuration of a continuously-arranged sensor system 1 and its operation will be described. The continuously-arranged sensor system 1 is made as a combination of the network unit and the sensor units. The continuously-arranged sensor system 1 according to the present embodiment can be made into various forms by combining the network unit 10 and at least one sensor unit. But, in the present embodiment, it is assumed that one network unit 10 and sixteen sensor units 30-1 (#1) to 30-16 (#16) are coupled and connected with each other as shown in FIG. 1 and FIG. 7. When the network unit 10 and the sensor unit 30-1 are coupled, the connectors 16 and 36 are connected with each other. Further, the connector 37 of each sensor unit is connected to the connector 36 of an adjacent sensor unit.

In the continuously-arranged sensor system 1 according to the present embodiment, the connector 18 of the network unit 10 is connected to the host control apparatus 43 via a cable, and the connector 17 is connected to a direct current power supply. In each sensor unit, an optical fiber, not shown, is extended to a monitoring position of a workpiece. The network unit 10 as shown in FIG. 7 is arranged with two connectors 18 to show an example of a communication system in which the connection to the host control apparatus 43 is assumed to be daisy chain connection. Accordingly, one of the connectors 18 is connected to another network unit 10 of upstream side or the host control apparatus 43, and the other of the connectors 18 is connected to another network unit of downstream side or is not connected to anything. It is to be understood that the present invention is not limited to daisy chain connection, and can be applied to other communication systems such as multi-drop connection as shown in FIG. 2 and FIG. 3.

In the continuously-arranged sensor system 1 having the above-described configuration, a unique address is set to each sensor unit during transmission of the serial signal. The address may be set using a DIP switch arranged on each sensor unit, or the address may be automatically set upon recognizing a connection state of each sensor unit.

In the continuously-arranged sensor system 1, the monitoring of workpieces is controlled as follows. When the control unit 11 of the network unit 10 transmits a timing signal to the adjacent sensor unit 30-1, the timing control unit 31*a* of the sensor unit 30-1 receives the timing signal.

When the timing control unit 31*a* of the sensor unit 30-1 receives the timing signal, the control unit 31 causes the light emitting unit 32 to emit light, so that the light receiving unit 33 obtains a light reception signal of a different level according to whether there is a workpiece or not. The light reception signal is converted into a binary determination signal using a threshold value set by the determination unit 31*b*, the determination signal is independently transmitted to the network unit 10 through the output transistor Q1 and by way of the parallel transmission line 41. The network unit 10 receives the determination signal via the output determination receiver unit 11*c*, and stores the current ON/OFF signal provided by the sensor unit 30-1 to the second area 14-2 of the table memory 14. The sensor unit 30-1 also outputs the determination signal to the outside through the output transistor Q2 and the output line 38. This determination signal and the amount of received light are stored in the sensor unit 30-1 until the determination signal and the amount of received light are updated by the determination signal or the amount of received light based on a subsequent timing signal.

After a predetermined time (for example, 10 micro seconds) passes since the timing signal is received, the timing control unit 31*a* transmits the timing signal to the adjacent sensor unit from the terminal 37*s*. As described above, the timing signal delayed by each sensor unit by a predetermined time is relayed to each sensor unit of downstream side in a bucket brigade manner. Accordingly, a time of light emission is delayed by the predetermined time in each sensor unit, so that a sensor unit of downstream side has a larger delay time of light emission than a sensor unit of upstream side. Therefore, an interference between photoelectric sensors can be prevented. Each sensor unit detects each workpiece, and respectively individually transmits the determination signal to the network unit 10 via the parallel transmission line 42.

Therefore, the determination signal of each sensor unit is transmitted to the network unit 10 without delay. The network unit 10 stores the data to the second area 14-2 of the table memory 14, so that, in response to an inquiry from the host control apparatus 43, the data can be read from the second area 14-2, and the current determination signal of each sensor unit can be transmitted.

The network unit 10 uses a data transmission command to request a particular sensor unit to transmit data through the serial transmission line 41. For example, when the data transmission command attached with the ID of the sensor unit 30-1 is transmitted, the sensor unit 30-1 transmits both of the current determination signal and the current amount of received light to the network unit 10 via the serial transmission line 41. This data is stored to an area #1 of the first area 14-1 of the table memory 14. As indicated by a hatched area in FIG. 8, the determination signal and the amount of received light are obtained at the same time, and the determination signal, i.e., ON/OFF state, is determined on the basis of the amount of received light. Similarly, each of the determination signal of each sensor unit and the amount of received light corresponding thereto stored in other areas of the first area 14-1 are obtained at the same time. However, when the determination signal and the sensor information are transmitted as a serial signal, there is a delay in time, and therefore, the determination signal is not necessarily the same as the determination signal of the sensor unit 30-1 stored in the second area 14-2 of the table memory 14.

The network unit 10 can transmit the data transmission command to the plurality of sensor units. For example, the data transmission command attached with the IDs of the sensor units 30-1, 30-2 and 30-4 is transmitted, each of these sensor units identifies the ID of its own, and transmits the current amount of received light and the determination signal based on this amount of received light to the network unit 10 via the serial transmission line 41. Each of them is received at a different time, but the obtained data themselves are in synchronization. In other words, the determination signal and the amount of received light exhibited at the same time can be obtained from these three sensor units. In FIG. 9, a hatched area indicates that the determination signals and the amounts of received light of the three sensor units are in synchronization.

The data transmission command may be transmitted to all of the connected sensor units. In such case, the data transmission command may be a command attached with an ID code common to the sensor units. As a result, a response can be obtained from each sensor unit via the serial transmission line 41. Each of these responses is obtained at a different time, but the obtained data themselves are in synchronization. In other words, the determination signal and the amount of received light exhibited at the same time can be obtained from all of the sensor units. FIG. 10 shows a thus obtained memory map of the table memory 14. As shown by a hatched area of FIG. 10, data of the determination signals and the amounts of received light obtained from the sensor units are exhibited at the same time.

In response to an inquiry from the host control apparatus 43, the network unit 10 reads the determinations signal and the amounts of received light of the sensor units and the sensors from the first area 14-1, and transmits the determinations signal and the amounts of received light to the host control apparatus 43 via the host IF 11*a* and the connector 18. The determination signals and the amounts of received light of the sensors are obtained at the same time, which does not involve any contradiction. The host control apparatus 43 can sample these signals as necessary, and can perform required processings such as displaying.

As described above, the network unit 10 is configured to convert same state variables of a sensor unit into different state variables in accordance with an obtainment path of the state variables and disclose the state variables to the host control apparatus. Therefore, the host control apparatus can perform controls and monitoring by making use of advantages relying on obtainment paths.

The network unit 10 may be previously configured to issue the data transmission command to all of the connected sensor units. Alternatively, the network unit 10 may be configured such that conditions about issuance of the data transmission command can be set by any one of the host control apparatus, the network unit 10, and the sensor unit 30. For example, the network unit 10 may be configured to receive a selection instruction as to whether the data transmission command is to be issued to a certain sensor unit, wherein the selection instruction is provided by a user interface of the host control apparatus and the operation unit of a sensor unit. Further, the network unit 10 may be configured to receive a selection instruction for selecting data to be transmitted from among the amount of received light, the margin, the threshold value, and the like. Further, the network unit 10 may be configured to receive an issuance frequency and an issuance precedence order of the data transmission command and the selection instruction of a group of data ensured to be in synchronization. Therefore, necessary data can be communicated in real time more accurately.

When a group of data ensured to be in synchronization is previously configured, the network unit 10 updates the memory map in the table memory 14 so as to ensure synchronization of data included in the group of data. For example, the network unit 10 may be configured such that, when the network unit 10 receives from the host control apparatus an inquiry about at least two data of data included in the group of data, the network unit 10 checks synchronization state of each data, and if the data are not yet in synchronization, the network unit 10 transmits the data to the host control apparatus upon waiting for the data to be synchronized. The network unit 10 may also be configured such that a memory area is arranged separately from the memory map of the table memory 14, and synchronization of previously configured groups of data is managed in this memory area, so that the groups of data in the memory map are updated as soon as the data are determined to be in synchronization.

Second Embodiment

Figure 11:
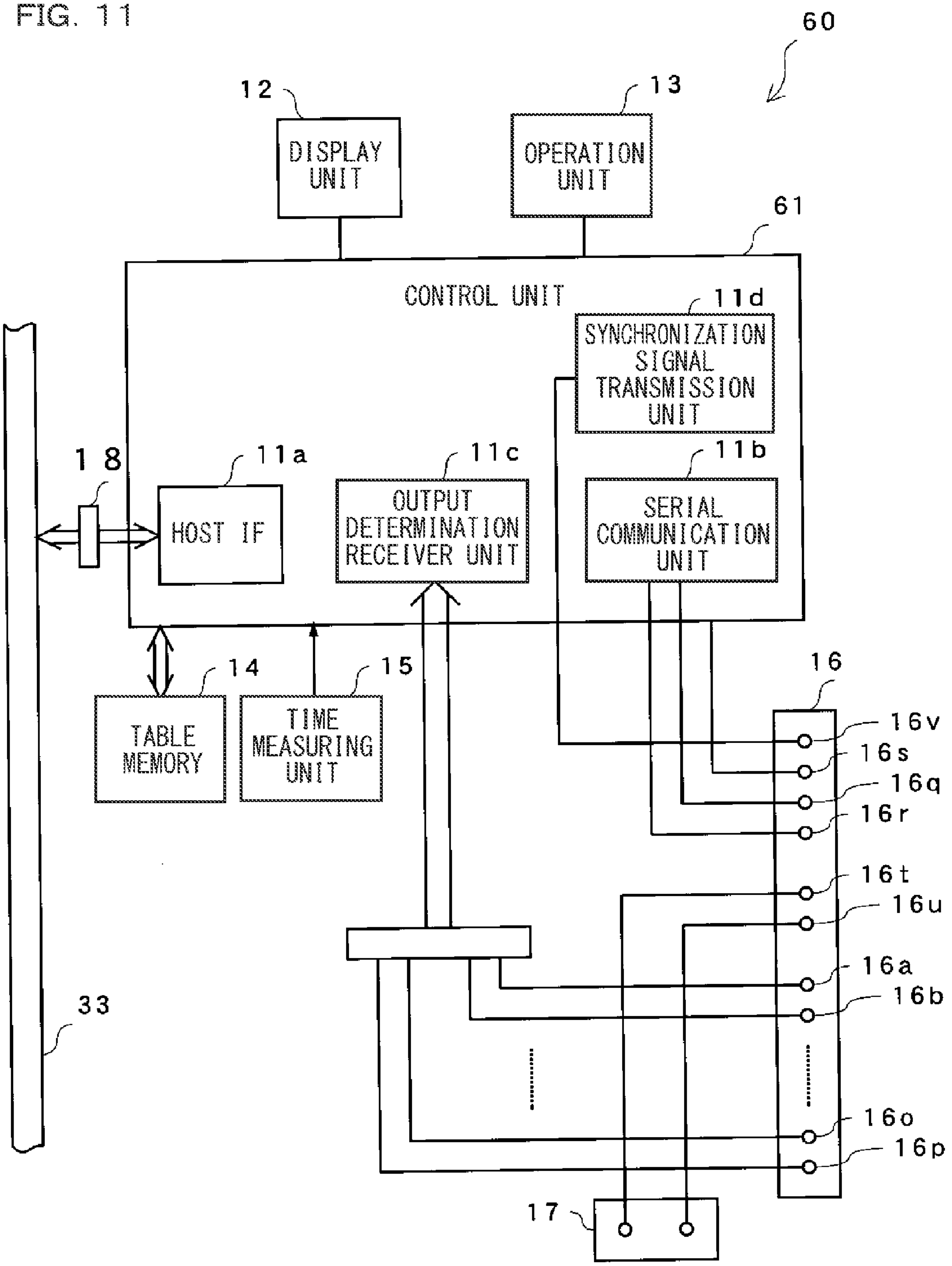
FIG. 11 is a block configuration diagram showing a configuration of a network unit in a continuously-arranged sensor system according to the second embodiment of the present invention.

Subsequently, a continuously-arranged sensor system according to the second embodiment will be explained. Also in the present embodiment, sixteen sensor units 70-1 to 70-16 are connected to a network unit 60. The same sections as those of the above-described first embodiment are denoted with the same reference numerals, and the detailed description thereabout is omitted. As shown in FIG. 11, the network unit 60 has a control unit 61 provided with a synchronization signal transmission unit 11*d*. The synchronization signal transmission unit 11*d* transmits a synchronization signal to a particular sensor unit or all of the sensor units. The connector 16 has a terminal 16*v* for synchronization signal transmission in addition.

Figure 12:
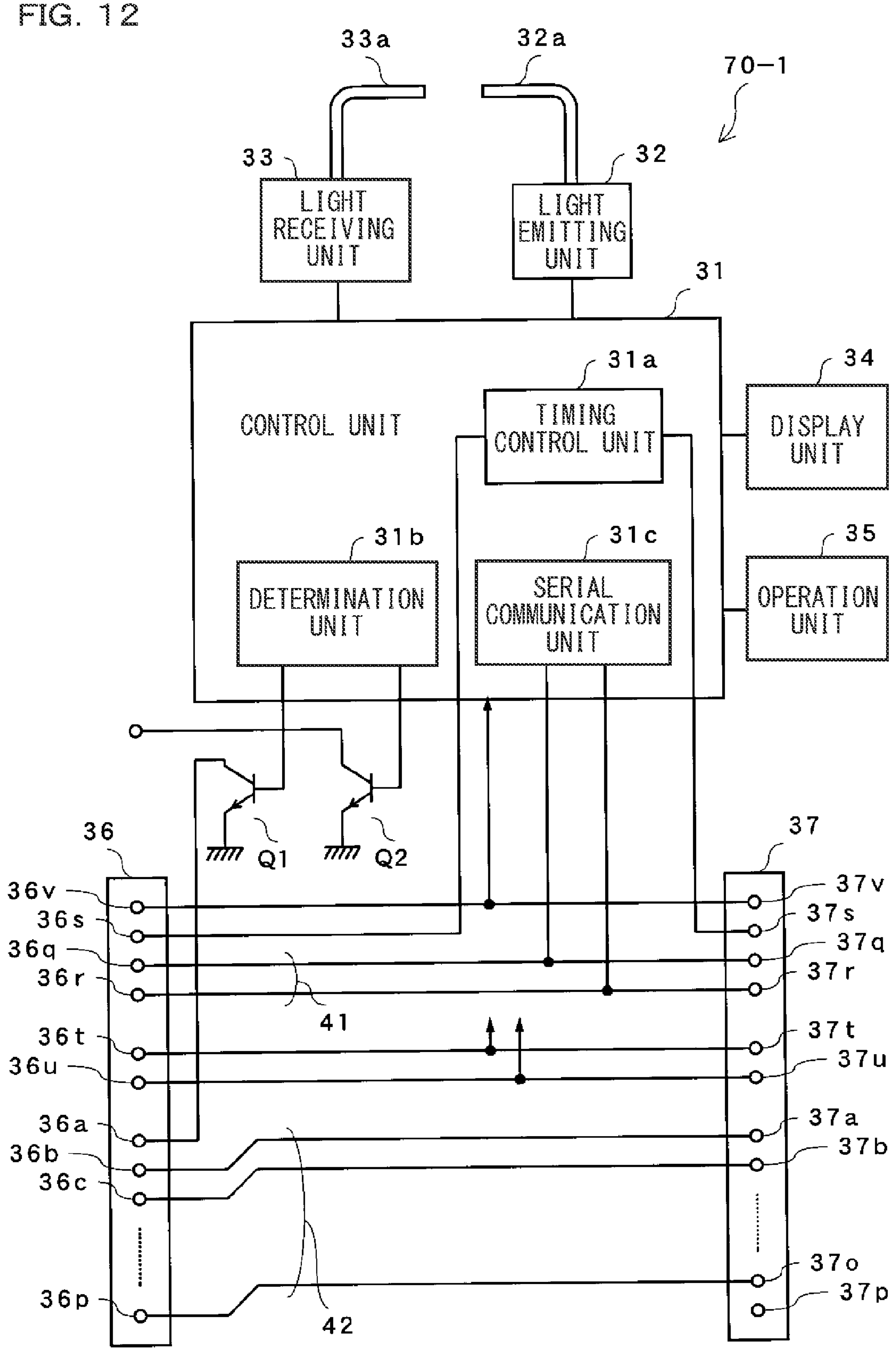
FIG. 12 is a block configuration diagram showing a configuration of a sensor unit in the continuously-arranged sensor system according to the second embodiment of the present invention.

Also in the present embodiment, the sixteen sensor units 70-1 to 70-16 are coupled with each other, but each of the sixteen sensor units has the same configuration. Therefore, only the sensor unit 70-1 will be explained on the basis of the drawings. FIG. 12 shows the sensor unit 70-1. The connectors 36 and 37 of the sensor unit 70-1 have connection terminals 36*v* and 37*v*, respectively, in addition. Between them, a line for a synchronization signal is directly connected, and further, the synchronization signal line is also input to the control unit 31. Other configurations are the same as those of the above-described first embodiment.

In this embodiment, all the sensor units are previously configured to respond to a synchronization signal through the serial transmission line. Then, the network unit 60 transmits the synchronization signal through the synchronization signal line. When the sensor units 70-1 to 70-16 receive the synchronization signal, each of the sensor units 70-1 to 70-16 transmits a signal made by synchronizing the determination signal and the amount of received light to the network unit 60 via the serial transmission line 41. Therefore, the determination signal and the amount of received light representing the state at the time when the synchronization signal is output can be stored to the first area 14-1 of the table memory 14. Alternatively, only a predetermined sensor unit may be previously configured to respond to the synchronization signal through the serial transmission line 41, so that data can be obtained by transmitting the synchronization signal to the predetermined sensor unit. In either case, it is not necessary to use the data transmission command, and therefore, each sensor unit can interpret a command in a less time, and the determination signal and the amount of received light representing the state at the time accurately corresponding to the synchronization signal can be obtained.

In the above explanation about the continuously-arranged sensor system according to the first and second embodiments, the sensor unit is assumed to be a transparent-type photoelectric sensor unit, but it may be other types of sensor units such as a reflective-type photoelectric sensor unit and a proximity sensor unit. The present invention can be applied to various sensor units for outputting a determination signal based on a detection signal.

In the above explanation about the continuously-arranged sensor system according to the first and second embodiments, the determination signal and the amount of received light of each sensor unit are transmitted in response to the synchronization signal or the command from the network unit, but what is transmitted from each sensor unit is not limited to the amount of received light. Information about the determination signal and detections of other sensors may be transmitted. The information about the sensor detection is not limited to the detection signal according to a physical quantity, and may include various kinds of information relating to the detection signal such as a peak hold value, a bottom hold value, a threshold value used for determining a detected quantity and making it into an ON/OFF signal, and a margin.

In the above explanation about the continuously-arranged sensor system according to the first and second embodiments, the sixteen sensor units are connected to the network unit, but the continuously-arranged sensor system can be structured by connecting any number of sensor units to the network unit 10.

In the first and second embodiments, the table memory may be configured to simultaneously store not only the time obtained by the time measuring unit 15 but also a time taken to transmit the data transmission command and a time taken to transmit the synchronization signal, which enables simultaneously obtaining a time signal in synchronization as shown in FIG. 4B. Further, a time at which the determination signal is received from each sensor unit through the parallel transmission line 42 can be recorded to the second area 14-2 of the table memory 14.

In the first and second embodiments, the current determination signal obtained from the parallel transmission line 42 is once stored to the second area 14-2 of the table memory 14. Alternatively, the current determination signal obtained from the parallel transmission line 42 may be directly transmitted as the parallel signal to the host control apparatus 43. In this case, the current determination signal of each sensor unit can be transmitted to the host control apparatus 43 in real time. Further, when the current determination signal obtained from the parallel transmission line 42 is directly transmitted as the parallel signal to the host control apparatus 43, it is not necessary to once store the determination signal obtained from the parallel transmission line 42 to the table memory. Therefore, the table memory may be made of only the first area 14-1 as shown in FIG. 4A or FIG. 4B.

In the present embodiment, the sensor unit is physically coupled to the network unit and is also electrically connected to the network unit. But a physical coupling and a signal connection may be separated. For example, several sensor units may be coupled with each other, and a signal line may be prepared to connect to another sensor unit.

INDUSTRIAL APPLICABILITY

The present invention relates to a continuously-arranged sensor system for monitoring a state of an object to be detected, and also relates to a network unit and a sensor unit used for this system, wherein information can be obtained in such a manner that simultaneousness between a determination signal and sensor information is ensured. The present invention can be preferably used for a continuously-arranged sensor system for processing workpieces in a manufacturing line.

What is claimed is:

1. A continuously-arranged sensor system comprising:

a network unit connected to a host control apparatus; and at least one or more sensor units, wherein the network unit and any one of the sensor units are physically connected with each other, and the sensor units are physically connected with each other, wherein the sensor unit includes:

a sensor unit for outputting a detection signal in accordance with a physical quantity detected from an object;

a control unit for generating a determination signal upon comparing the detection signal with a predetermined threshold value, and receiving a command from the network unit, the control unit transmitting the determination signal and sensor information relating to the detection signal as a serial signal;

a connection unit for connecting to the adjacent network unit or the adjacent sensor unit;

a serial transmission unit for transmitting and receiving the serial signal; and a parallel transmission line for transmitting, in parallel, each of the determination signals generated by the control units of the sensor units, wherein the network unit includes:

a connection unit for connecting to any one of the sensor units that is adjacent to the network unit;

a serial transmission unit for transmitting and receiving a command, the determination signal, and the sensor information as a serial signal, wherein the command is transmitted to the sensor unit, and wherein the determination signal and the sensor information are transmitted from the sensor unit;

a control unit for requesting to the coupled sensor unit for a current determination signal and current sensor information, and receiving the determination signal and the sensor information transmitted via the serial transmission unit; and a memory including a first area for storing a pair of the determination signal and the sensor information transmitted from the sensor unit via the serial transmission unit and a second area for storing the determination signal transmitted from each of the sensor units via the parallel transmission line.

2. The continuously-arranged sensor system according to claim 1 further comprising a synchronization signal line connected between the network unit and each of the sensor units, wherein the control unit of the network unit transmits a request for the determination signal and the sensor information via the synchronization signal line to a predetermined sensor unit.

3. The continuously-arranged sensor system according to claim 1, wherein the sensor information is any one of the detection signal to be detected, a peak hold value thereof, a bottom hold value thereof, a threshold value for determination, and a margin.

4. The continuously-arranged sensor system according to claim 1, wherein the connection unit of the network unit includes a connector for making a connection in terms of signal, wherein the connection unit of the sensor unit includes a connector for making a connection in terms of signal, and wherein the serial transmission line and the parallel transmission line are formed between the units by connecting the units via the connection unit of the network unit and the sensor unit.

5. A network unit used in a continuously-arranged sensor system including a network unit connected to a host control apparatus, and at least one or more sensor units, wherein the network unit and any one of the sensor units are physically connected with each other, and the sensor units are physically connected with each other, the network unit comprising:

a connection unit for connecting to any one of the sensor units that is adjacent to the network unit;

a serial transmission unit for transmitting and receiving a command, the determination signal, and the sensor information as a serial signal, wherein the command is transmitted to the sensor unit, and wherein the determination signal and the sensor information are transmitted from the sensor unit;

a control unit for requesting to the coupled sensor unit for a current determination signal and current sensor information, and receiving the determination signal and the sensor information transmitted via the serial transmission unit; and a memory including a first area for storing a pair of the determination signal and the sensor information transmitted from the sensor unit via the serial transmission unit and a second area for storing the determination signal transmitted from each of the sensor units via the parallel transmission line.

6. The network unit according to claim 5, wherein the control unit of the network unit transmits a data transmission command to a predetermined sensor unit via the serial transmission unit so as to request the determination signal and the sensor information.

7. The network unit according to claim 5, further comprising a synchronization signal line connected between the network unit and each of the sensor units, wherein the control unit of the network unit transmits a request for the determination signal and the sensor information via the synchronization signal line to a predetermined sensor unit.

8. A network unit used in a continuously-arranged sensor system including a network unit connected to a host control apparatus, and at least one or more sensor units, wherein the network unit and any one of the sensor units are physically connected with each other, and the sensor units are physically connected with each other, the network unit comprising:

a connection unit for connecting to any one of the sensor units that is adjacent to the network unit;

a serial transmission unit for transmitting and receiving a command, the determination signal, and the sensor information as a serial signal, wherein the command is transmitted to the sensor unit, and wherein the determination signal and the sensor information are transmitted from the sensor unit;

a control unit for requesting to the coupled sensor unit for a current determination signal and current sensor information, and receiving the determination signal and the sensor information transmitted via the serial transmission unit; and a memory for storing a pair of the determination signal and the sensor information transmitted from the sensor unit via the serial transmission unit, wherein the determination signal transmitted from each of the sensor units via the parallel transmission line is transmitted to the host control apparatus as it is.

9. The network unit according to claim 8, wherein the control unit of the network unit transmits a data transmission command to a predetermined sensor unit via the serial transmission unit so as to request the determination signal and the sensor information.

10. The network unit according to claim 8, further comprising a synchronization signal line connected between the network unit and each of the sensor units, wherein the control unit of the network unit transmits a request for the determination signal and the sensor information via the synchronization signal line to a predetermined sensor unit.

* * * * *